United States Patent
Mies

(10) Patent No.: US 6,439,364 B1
(45) Date of Patent: Aug. 27, 2002

(54) INCHING BRAKING SYSTEM

(75) Inventor: Hubertus Mies, Lohr am Main (DE)

(73) Assignee: Mannesmann Rexroth AG, Lohr (DE)

( * ) Notice: Subject to any disclaimer, the term of this patent is extended or adjusted under 35 U.S.C. 154(b) by 0 days.

(21) Appl. No.: 09/646,834

(22) PCT Filed: Mar. 22, 1999

(86) PCT No.: PCT/DE99/00836

§ 371 (c)(1),
(2), (4) Date: Oct. 25, 2000

(87) PCT Pub. No.: WO99/52734

PCT Pub. Date: Oct. 21, 1999

(30) Foreign Application Priority Data

Apr. 8, 1998 (DE) .......................... 198 15 889

(51) Int. Cl.[7] .......................... B60K 41/26; B60T 11/10
(52) U.S. Cl. .......................... 192/221; 192/13 R; 60/436
(58) Field of Search ................. 192/220, 221, 192/225, 13 R, 12 C; 60/435, 436

(56) References Cited

U.S. PATENT DOCUMENTS

| 3,941,223 | A | * | 3/1976 | Murakami ................... 192/221 |
| 4,441,596 | A | * | 4/1984 | Nakahara et al. ......... 192/13 R |
| 4,865,176 | A | * | 9/1989 | Blake et al. ............... 192/3.63 |
| 5,168,899 | A | * | 12/1992 | Cerrone et al. ........ 137/625.66 |
| 6,038,858 | A | * | 3/2000 | Mies ........................... 60/436 |

FOREIGN PATENT DOCUMENTS

| DE | 195 25 582 A1 | | 1/1997 | |
| GB | 1409905 | * | 10/1975 | |
| GB | 2032062 A | * | 4/1980 | ............ 137/625.69 |

* cited by examiner

Primary Examiner—Richard M. Lorence
(74) Attorney, Agent, or Firm—Oliff & Berridge, PLC

(57) ABSTRACT

There is disclosed an inching braking system wherein a brake piston of a brake valve assembly initiates an actuation movement of the brake piston by way of an actuator only after a predetermined stroke of a driving member for an inching piston.

14 Claims, 3 Drawing Sheets

INCHING BRAKING SYSTEM

The invention relates to an inching braking system including an inching valve assembly and a brake valve assembly in accordance with the preamble of claim 1.

The like inching braking system are utilised in hydraulically operated work tools, for example in wheel loaders, stacker trucks etc., wherein the hydraulic drive system is also utilised for decelerating, besides the brake system proper. Braking with the aid of the drive system is referred to as "inching". Splitting the braking force between brake system proper and drive system has the advantage that wear to the brakes of the work tool may be reduced quite considerably in comparison with solutions lacking an inching braking system inasmuch as the drive system may primarily be utilised for deceleration at minor changes of speed.

In the like conventional systems, actuation is achieved, for example, through a brake pedal, through which the brake system of the work tool receives application of a braking pressure in dependence on the actuation angle of the pedal. This braking pressure acts as a control pressure for an inching valve, through which the drive system of the work tool may be controlled for inching. The brake system is biased by means of a return spring or a biasing valve in such a way that the brake will take effect only after a minimum braking pressure of, e.g., 9 bar has been exceeded. In such conventional solutions, the characteristic line for the braking pressure rises relatively shallowly in the inching range to then receive a greater gradient when the inching pressure drops to zero, so that the actual braking process takes place subsequently to the inching process. The inching pressure will thus reach its minimum value when the braking pressure enters into the range wherein the braking process is initiated through the brake unit.

Upon use of such conventional inching braking system it is found that particularly in the transitional range from the inching process to the introductory phase of the actual braking process discontinuities may occur, so that the inching process is already overlapped by the onsetting braking process. Inasmuch as these discontinuities are not manageable in the conventional systems, it was proposed in DE 195 25 582 A1 to this applicant to couple the brake valve assembly and the inching valve assembly of an inching braking system via common transfer means, so that the spools of both valve assemblies are controlled upon actuation of the brake pedal. Owing to this measure it is ensured that the braking pressure for the brake system will rise only once the inching pressure has dropped to zero. In this way, the discontinuities in the transitional range from inching to braking are prevented.

In some applications it may, however be advantageous if the braking pressure assumes a predetermined threshold value already during the inching process. This specific pressure management of the inching braking system having intersecting inching and braking characteristic lines is not possible in a defined manner with the aid of the above described constructions.

In contrast, the invention is based on the object of creating an inching braking system wherein the braking pressure may be built up substantially independently of the inching pressure.

This object is attained by an inching braking system having the features of claim 1.

Owing to the measure of directly coupling the spool of an inching valve assembly through a driving member with the actuation means, preferably with the brake pedal, and associating with the brake piston an actuator which will effect an actuation movement of the brake piston only after a predetermined stroke of the driving member, the brake piston may be taken into its controlled position when maximum inching, i.e., the maximum braking effect due to the drive system, has not been reached yet. In this manner, accurate harmonisation of the inching and braking processes is possible, wherein different regions of intersection of the characteristic lines of the inching valve assembly and of the brake valve assembly may be adjusted by means of a corresponding design of driving member and actuator. In this way, the entire braking process (inching and braking through the brake system) may optimally be adapted to the respective operating conditions.

The structure of the inching braking system is particularly simple if the driving member for the inching valve spool is formed as pin means which contact the actuation means on the one hand and the inching piston on the other hand.

The space required by the inching braking system may be minimised if the two pistons of the braking and inching valve assemblies are accommodated inside a housing such as to have a successive coaxial arrangement, and the pin means slidingly extend through the brake piston so that the latter, as it were, serves as a guide for the pin means.

The structure of the actuation means is particularly simple if they have the form of an actuation rod biased into its rest position by an inching spring acting on an inching spring plate, with the pin means also contacting the inching spring plate.

In order to compensate offset between the centers of the brake piston and a guide bush for the inching piston, the pin means are preferably constituted by two pins having a successive coaxial arrangement, one of which is guided within the brake piston and the other one within the guide bush.

In a preferred embodiment, the brake piston carries on one end portion a spring plate for supporting a brake spring, wherein the end portion of the brake spring which is removed from the spring plate, may be taken into contact with the actuation rod.

In order to ensure against breakage of the inching spring, the actuation rod may be provided with a stop which may be taken into contact with the inching spring plate.

Advantageously, the inching piston and the pin means are biased through an inching pressure spring into their basic positions, with the brake piston being supported through a control spring on the adjacent end portion of the guide bush for the inching piston.

Further advantageous developments of the invention are the subject matters of the further subclaims.

In the following, a preferred embodiment of the invention shall be explained in more detail by referring to schematic drawings, wherein.

Figure 1:
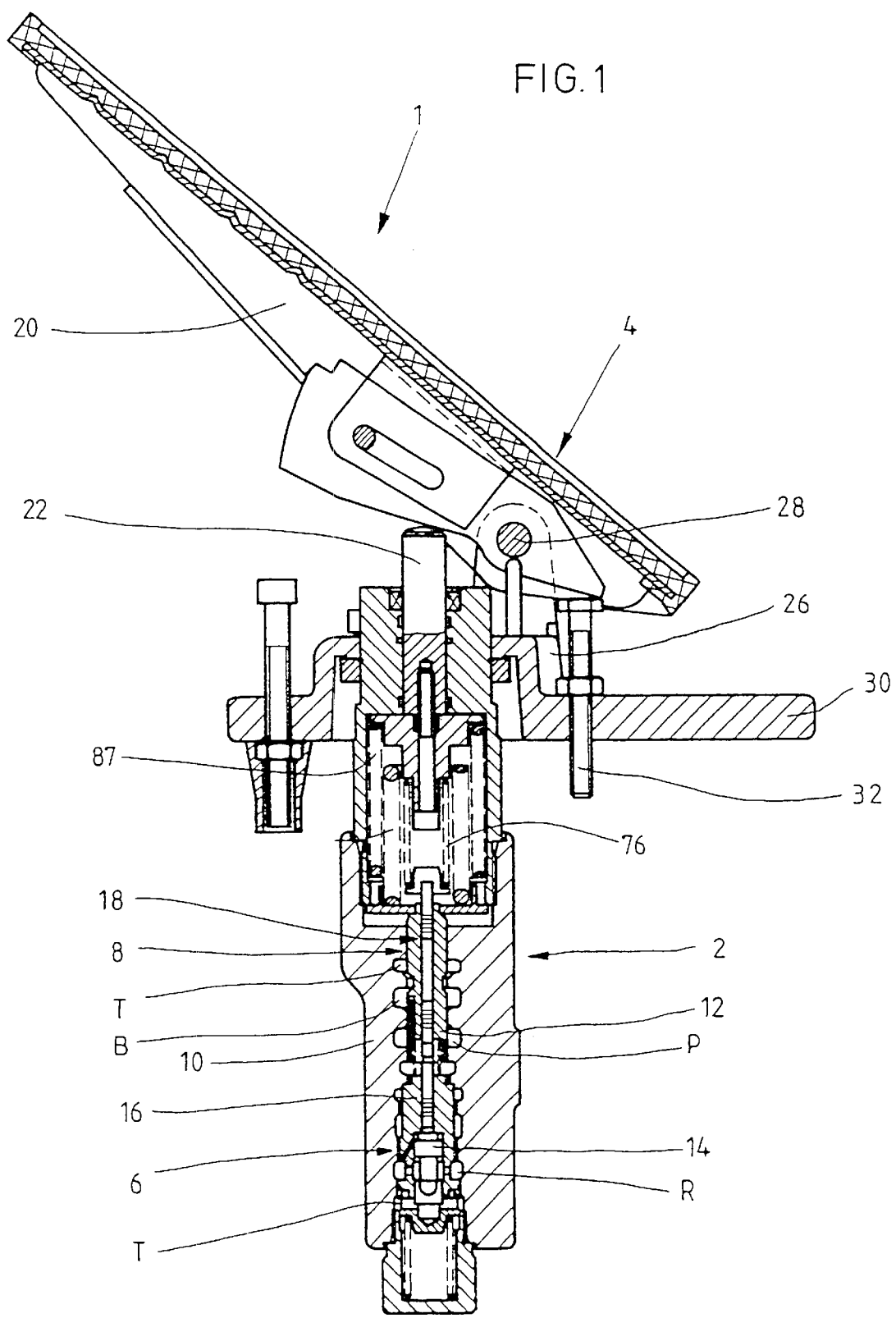
FIG. 1 is a sectional view of an inching braking system according to the invention.

FIG. 1 shows a longitudinal sectional view of inching braking system 1 as employed, for example, in controlling a wheel loader. The represented inching braking system 1 includes an inching braking valve assembly 2 which may be actuated through actuation means 4.

The inching braking valve assembly 2 is substantially comprised of an inching valve assembly 6 and of a brake valve assembly 8 which are received within a common valve housing 10. The brake valve assembly 8 includes a brake piston 12 guided directly inside the valve housing 10. An inching piston 14 of the inching valve assembly 6 is guided within a guide bush 16 which, in turn, is received within the valve housing 10. By actuating the inching piston 14, a tank port T of the valve housing 10 may be connected with a work port to which a hydrostatic drive (not represented) is connected. In its represented basic position, the work port R is blocked with respect to the tank port T, so that the hydrostatic drive is supplied with the maximum inching pressure $p_I$.

With the aid of the brake piston 12, the connection between another tank port T and a work port B (brake port), to which the brake system proper of the wheel loader is connected, may be controlled closed. In addition to controlling open the work port B, upon actuation of the brake piston 12 the connection between a pressure port, e.g. a pump port or reservoir port P and the work port B is controlled open, so that the latter is supplied with hydraulic fluid, and the braking pressure $p_B$ for controlling the brake system proper is built up.

Actuation of the inching piston 14 is achieved by means of pin means 18 which extend through the brake piston 12 and the guide bush 16 and contact the neighboring face of the inching piston 14. Actuation of the inching piston 14 and of the brake piston 12 takes place via the actuation means 4 including in the represented embodiment a brake pedal 20 which acts on a spring biased actuation rod 22. The latter is biased into its basic position by a return spring 24 and an inching spring 76. The latter is supported against the pin means 18.

The brake pedal 20 is pivotally mounted by means of a mounting bracket 26 including a swivel pin 28 on a floor panel 30 of the wheel loader. The floor panel 30 has a stop 32 for the brake pedal 20 which is biased through actuation rod 22 and return spring 24. Further details of the inching brake valve assembly 2 according to the invention shall now be explained by referring to the enlarged representation of FIG. 2.

The valve housing 10 includes a valve bore 36 having axially spaced ring grooves 38, 40, 42, 44 and 46, whereby the tank port T, the work port R, the pump port P, the work port B, and the further tank port T are formed.

Via a ring groove 48, leakage oil may be returned to the tank.

In the range of the two ring grooves 38, 40 (tank port T, work port R), the guide bush 16 is fastened in the valve bore 36. The guide bush 16 has a center bore which expands downwardly (view of FIG. 2) into a guide bore 50 for the inching piston 14. The latter comprises a control collar 52 radially expanded relative to the base body of the inching piston 14. At the upper end portion of the inching piston 14 in the view of FIG. 2, a radial collar is formed which determines the diameter of the inching piston's rear side. The inching piston's rear side (top in FIG. 2) is connected with the ring groove 40 (port R) via an oblique bore 58. In the represented basic position, the upper end portion of the inching piston 14 contacts the radial shoulder of the guide bore 50.

Figure 2:
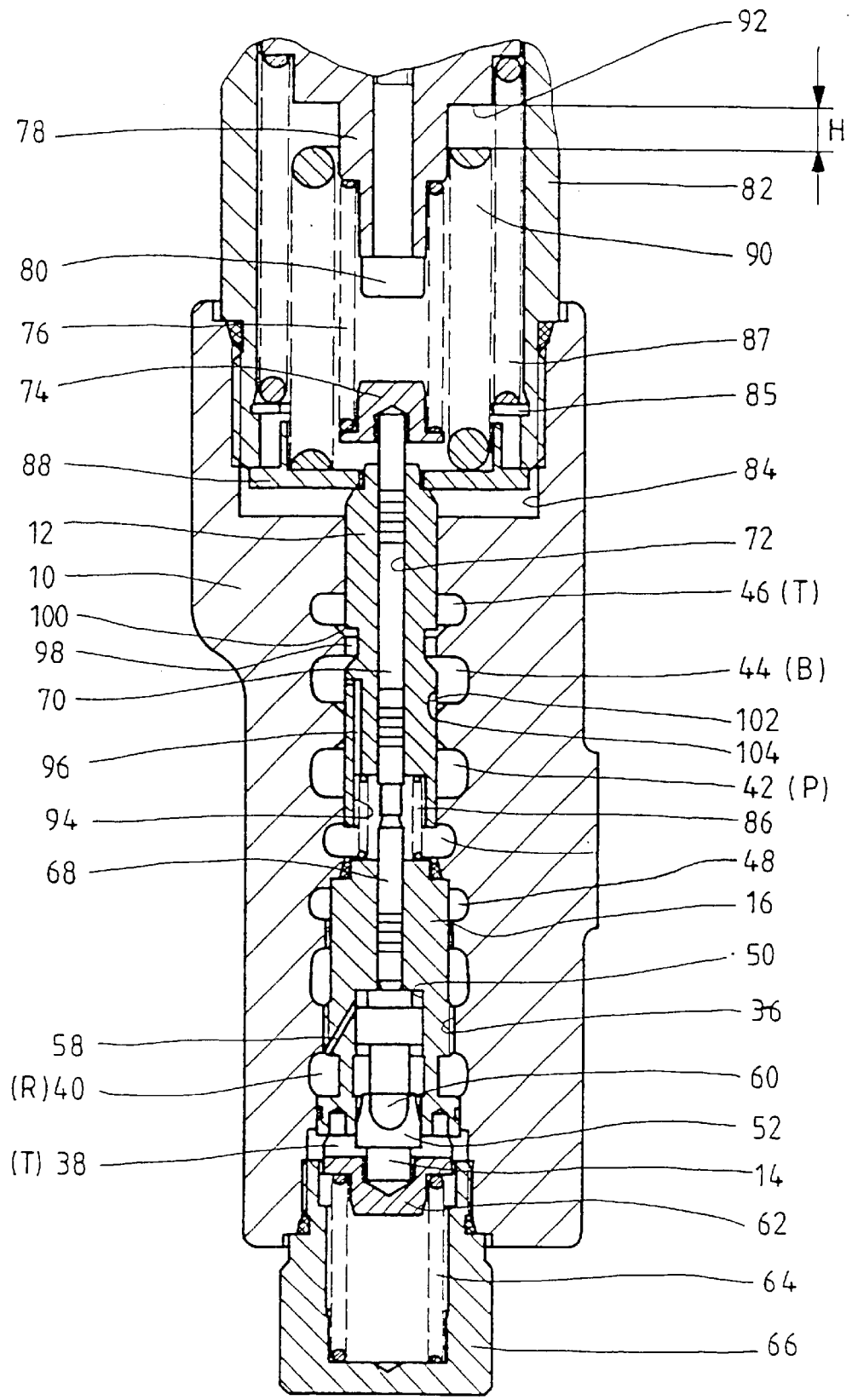
FIG. 2 is a detailed view of the inching braking system of FIG. 1.

At the lower control collar 52 in the representation of FIG. 2, control notches 60 are formed which are distributed over the periphery, and whereby the work port R may be connected with the tank port T upon an axial displacement of the inching piston 14.

On the end portion of the inching piston 14 connecting to the control collar 52, a spring plate 62 is fastened on which an inching pressure spring 64 acts, which in turn is supported against the internal face of a screw plug 66. The latter stops the valve bore 36 of the valve housing 10.

The guide bush 16 has in the range of the ring groove 40 a radial bore star, so that the pressure at the work port R acts on control collar 52 on the face side.

In the embodiment represented in FIG. 2, the pin means include two pins 68, 70 having a successive coaxial arrangement, of which the former is guided in the radially narrowing part of the guide bore 50 of the guide bush 16, whereas the second pin 70 is slidably guided in a center bore 72 of the brake piston 12.

In the represented basic position, the second pin 70 protrudes from the upper end portion of the brake piston 12 and carries an inching spring plate 74 against which an inching spring 76 is supported. The latter acts on a support member 78 of the actuation means 4, which support member is connected to the actuation rod 22 via a stop screw 80. The support member 78 is guided in an axially slidable manner within a bearing bush 82 whereby the valve housing 10 is closed to the top (view of FIG. 2). In the shown embodiment, the bearing bush 82 is screwed into a radially expanded reception portion 84 of the valve bore 36. At the inner peripheral wall of the bearing bush 82, a peripheral groove is formed such as to receive a support ring 85 against which a return spring 87 biasing the support member 78 into its basic position against the internal ring face of the reception portion 84 is supported.

The axial spacing between the head of the stop screw 80 and a collar of the inching spring plate 74 is selected such that these two components will contact each other following a predetermined stroke of the actuation rod and thus of the support member 78, so that a further displacement of the actuation rod towards the inching spring plate 74 is precluded. In this way the inching spring 76 is protected against damage due to excessive compression.

The inching spring 76 is biased in order to keep the dead stroke as small as possible.

The upper face of the guide bush 16 in the representation of FIG. 2 terminates approximately in the range of the ring groove 48, so that the end portion of the first pin 68, which is removed from the inching piston 14, projects from this face into this ring groove 48. Against this end portion of the guide bush 16 a return spring 86 is supported which biases the brake piston 12 into its represented basic position. In this position, the upper end portion of the brake piston 12 projects into the reception portion 84. In this range there is formed on the brake piston 12 a contact shoulder for a spring plate 88 which is biased by the bias of the brake piston 12 against the lower ring face of the support member 78 and thus can only be displaced towards the face of the reception portion 84 in the axial direction. On this spring plate 88 there rests a brake spring 90, the spring rate of which is substantially greater than that of the inching spring 76. The one end portion of this brake spring 90 removed from the spring plate 88 terminates at an axial spacing from a stop surface 92 of the support member 78, so that the brake spring 90 will only take effect following a predetermined stroke of the support member 78.

The brake piston 12 has at its end portion adjacent the guide bush 16 a bore 94, at the inner base surface of which the return spring 86 is supported. In its represented basic position, the ring face of the brake piston 12 is located approximately in the range of the ring groove 48, and the two pins 68, 70 contact each other approximately in the range of this ring groove 48 and of the bore 94.

Away from the internal base surface of the bore 94 there extends initially off-center in the axial direction a pressure measurement bore 96 for the braking pressure, the radial end portion of which opens into the ring groove 44 in which the work port B is formed. In this way the pressure is guided at the work port B via the pressure measurement bore 96 to the lower face.

Approximately in the center portion of the brake piston 12, a control groove 98 is formed whose width is selected such that the two ring grooves 46, 44 are communicating in the represented basic position via the control groove 98.

By the control groove 98 a control land 100 is defined through which the connection between the two ring grooves 46 and 44 and thus the connection from the work port B to the tank port T may be controlled closed or open by an axial movement of the brake piston 12. The control land 100 has suitable fine control notches or surfaces for enabling fine control.

When viewed in the basic position, about in the range of the ring groove 44, there are moreover provided at the outer periphery of the brake piston 12 control notches 102 whereby a control land 104 is formed for controlling the connection between the ring grooves 44 and 42 (work port B, pump port P) open or closed. In the represented basic position, the connection from B to P is blocked.

In the above described embodiment, two pins 68, 70 are selected in order to compensate an offset between the centers of the center bore 72 of the brake piston 12 and of the guide bore 50 of the bush 16. Here a precondition is that the second pin 70 will not plunge into the guide bore 50 of the guide bush 16 during its downward final stroke. It would, of course, also be possible to select a continuous pin.

In the represented basic position, i.e. when the brake pedal 20 is not actuated, the brake piston 12 is biased into its basic position by the return spring 86, in which position the spring plate 88 contacts the bearing bush 82. In this basic position of the brake piston 12, the work port B communicates with the tank port T, and the connection from B to P is blocked. At the lower face of the brake piston 12, the pressure at work port B (braking pressure) is present.

The connection between the tank port T and the work port R (inching port) is—with the exception of a leakage— interrupted by the control collar 52.

In the non-actuated condition of the brake pedal, the inching pressure $p_I$ is guided via the oblique bore 58 to the rear side of the inching piston 14. This pressure at the rear side of the inching piston 14 (measured pressure) also acts on the adjacent face of the pin 68. The bias of the inching pressure spring 64 is selected such that the spring force is approximately equal to the pressure force at the rear side of the inching piston 14. Via the pins 68, 70 basically no force is transmitted to the inching piston 14 in this basic position.

In the actuated condition of the brake pedal, i.e. upon rotation about the swivel pin 28, the support member 78 is displaced towards the face of the reception portion 84, so that the biased inching spring 76 is compressed. The force of the inching spring 76 is transmitted via the spring plate 74 to the pins 68, 70, so that accordingly the force of the inching pressure spring 64, the inching pressure $p_I$ at the rear side of the inching piston 14, and the force of the inching spring 76 act on the inching piston 14. I.e., the displacement of the inching piston 14 is substantially determined by the equilibrium of forces between the inching pressure spring 64, the inching spring 76 and the resulting force from the inching pressure $p_I$. Herein the pressure at the tank port 38 is disregarded. In dependence on the acting forces, the inching piston 14 is moved out of its basic position against the force of the inching pressure spring 64, and following a predetermined stroke the connection between the inching port R and the tank port T is controlled open via the control notches 60 of the inching piston 14. The inching pressure is reduced towards the tank, so that the measured pressure at the inching piston's rear side drops and an equilibrium of pressures may occur in dependence on the brake pedal position. The inching piston 14 is correspondingly located in its controlled position, with the inching pressure $p_I$ decreasing with an increasing pressure force of the inching spring 76.

Figure 3:
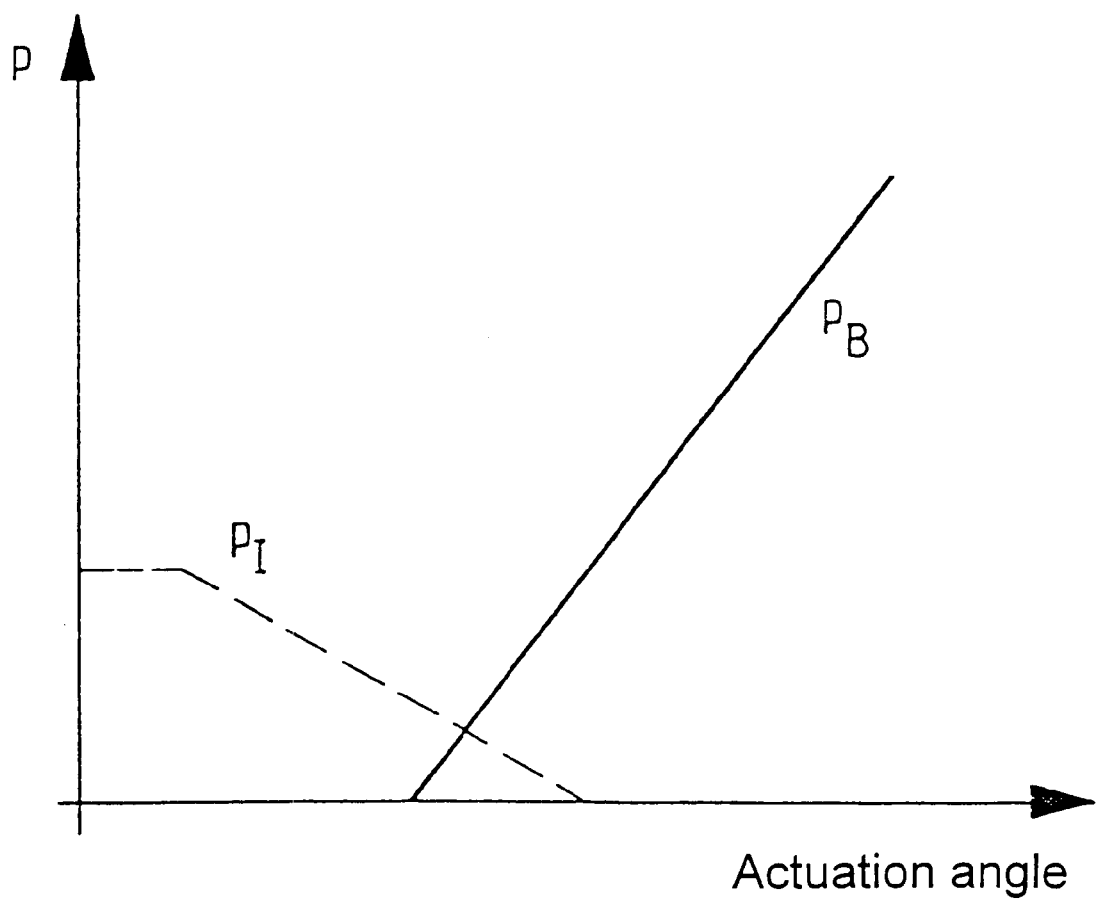
FIG. 3 shows characteristic lines of the inching braking system of FIG. 1.

The development of the corresponding characteristic line for the inching pressure $p_I$ is represented in phantom line in FIG. 3. Accordingly, the inching pressure does not change during the initial rotation of the brake pedal 20 owing to the bias of the inching spring 76, to then steadily drop from its maximum value to zero in dependence on the actuation angle of the brake pedal 20.

At a predetermined actuation angle of the brake pedal 20, which corresponds to a stroke H of the actuation rod 22 and thus of the support member 78, the contact shoulder 92 enters into contact with the brake spring 90, so that following this stroke H the brake piston 12 receives a spring force against the force of the return spring 86. Due to the considerably greater spring rate of the brake about I.e., through selecting the dead stroke H and suitable harmonization of the spring rates of the brake spring 90 and of the control spring 86, it is possible to accurately set the one actuation angle of the brake pedal 20 at which the brake piston 12 for the first time performs a control movement, so that the axial displacements of the brake piston 12 and of the inching piston 14 may be controlled nearly independently of each other.

As a result of the axial displacement of the brake piston 12, the connection from the tank port T to the brake port B is controlled closed through the control land 100, while the connection from the pump port P to the brake port B is controlled open through the control land 104, so that the brake system is supplied with hydraulic fluid. The braking pressure $p_B$ at the brake port B is routed via the pressure return bore 96 to the lower face of the brake piston 12, so that the brake spring 90 acts against the force of the weak control spring 94 and the pressure force resulting from the braking pressure $p_B$. The brake piston 12 has now reached its controlled position wherein the control position depends on the equilibrium of forces between the brake spring 90 on the one hand and the pressure force $p_B$ and the force of the control spring 94 on the other hand. With an increasing force of the brake spring 90 (depending on the actuation angle of the brake pedal), the brake piston 12 is displaced more strongly, so that the connection from the pump port P to the tank port B is controlled open further, and the connection to the tank port T is increasingly controlled closed. The braking pressure $p_B$ thus steadily rises in dependence on the actuation angle from zero to its maximum value.

As was already mentioned above, it may be achieved through corresponding selection of the axial length of the pins 68, 70 and of the stroke H and through corresponding harmonisation of the springs that the increase of the braking pressure $p_B$ already starts prior to the inching pressure $p_I$ dropping to zero, so that the two characteristic lines intersect. Such a characteristic matching of lines was not possible in the above described prior art because in the known constructions, the braking pressure built up either from the beginning or after the end of the inching process. The structure according to the invention opens up a wide range for design, for with this structure both the developments of the characteristic lines in the prior art and the overlapping characteristic lines according to FIG. 3 may be realised with virtually any overlap regions.

What is disclosed is an inching braking system wherein a brake piston of a brake valve assembly initiates an actuation movement of the brake piston by way of an actuator only after a predetermined stroke of a driving member for an inching piston.

What is claimed is:

1. Inching braking system including an inching valve assembly and a brake valve assembly, wherein upon actuation of actuation means drive means or brake means, respectively, of a work tool may be controlled, wherein pistons of said inching valve assembly and of said brake valve assembly are operatively connected with said actuation means by way of transfer means, characterized in that said transfer means have a driving member for said inching piston and an actuator for said brake piston, which will initiate an actuation movement of said brake piston following a predetermined stroke of one of said driving member and said actuation means.

2. Inching braking system according to claim 1, characterized in that said driving member is a pin means which may receive the application of a force by said actuation means on the one hand and contacts said inching piston on the other hand.

3. Inching braking system according to claim 2, characterized in that said pistons are accommodated in a valve housing in successive arrangement, and that said pin means slidingly pass through said brake piston.

4. Inching braking system according to claim 2, characterized in that said actuation means include an actuation rod which is biased through an inching spring which acts on an inching spring plate, and in that said pin means contact said inching spring plate.

5. Inching braking system according to claim 3, characterized in that said actuation means include an actuation rod which is biased through an inching spring which acts on an inching spring plate, and in that said pin means contact said inching spring plate.

6. Inching braking system according to claim 3, characterized in that said pin means comprise pins having a successive coaxial arrangement which are guided in said brake piston or in a guide bush (16) for said inching piston, respectively.

7. Inching braking system according to claim 4, characterized in that said pin means comprise pins having a successive coaxial arrangement which are guided in said brake piston or in a guide bush (16) for said inching piston, respectively.

8. Inching braking system according to claim 5, characterized in that said pin means comprise pins having a successive coaxial arrangement which are guided in said brake piston or in a guide bush (16) for said inching piston, respectively.

9. Inching braking system according to claim 3, characterized in that a pressure return bore is formed in said brake piston.

10. Inching braking system according to claim 2, characterized in that said inching piston is biased into its basic position through an inching pressure spring.

11. Inching braking system according to claim 6, characterized in that said brake piston is biased through a control spring which is supported against said guide bush.

12. Inching braking system according to claim 3, characterized in that a pressure return bore is formed in said brake piston, in that said inching piston is biased into its basic position through an inching pressure spring, and in that said brake piston is biased through a control spring which is supported against said guide bush.

13. Inching braking system according to claim 1, characterized in that on one end portion of said brake piston a spring plate for supporting a brake spring is formed, wherein the end portion of said brake spring which is removed from said spring plate may, following a stroke, be taken into contact with said actuation rod or a support member fastened thereto and including a stop.

14. Inching braking system in accordance with claim 4, characterized in that on one end portion of said brake piston a spring plate for supporting a brake spring is formed, wherein the end portion of said brake spring which is removed from said spring plate may, following a stroke, be taken into contact with said actuation rod or a support member fastened thereto and including a stop and in that said actuation rod or said support member have a stop which may be taken into contact against said inching spring plate.

* * * * *